United States Patent [19]
Abalo

[11] 3,881,591
[45] May 6, 1975

[54] CONVEYING MEANS FOR A MOLD STRUCTURE

[75] Inventor: Juan Manuel Abalo, Buenos Aires, Argentina

[73] Assignee: Noel y Compania Limitada Sociedad Anonima Argentina de Dulces y Conservas, Buenos Aires, Argentina

[22] Filed: Sept. 13, 1973

[21] Appl. No.: 396,773

Related U.S. Application Data

[62] Division of Ser. No. 165,065, July 22, 1971, Pat. No. 3,778,018.

[52] U.S. Cl. ................ 198/175; 198/171; 198/189
[51] Int. Cl. ............................................. B65g 19/24
[58] Field of Search ........... 198/168, 171, 172, 175, 198/176, 189

[56] References Cited
UNITED STATES PATENTS

| | | | |
|---|---|---|---|
| 2,226,989 | 12/1940 | Young | 198/168 |
| 2,571,444 | 10/1951 | Hapman | 198/168 |
| 2,756,866 | 7/1956 | Wilde | 198/168 |
| 2,815,116 | 12/1957 | Erickson | 198/172 |
| 3,282,405 | 11/1966 | Larson et al. | 198/168 |

*Primary Examiner*—Evon C. Blunk
*Assistant Examiner*—Jeffrey V. Nase
*Attorney, Agent, or Firm*—Karl W. Flocks

[57] ABSTRACT

Conveying means, preferably for conveying molds through a casing member to sealingly separate the inlet from the outlet of said casing member, said conveying means including sealing means adapted to enter said casing member and slide therethrough in sealing contact, at the same time as said sealing means push said molds through said casing member, said sealing means having adjustable means to increase the size of said sealing means to compensate wear and tear, for maintaining the sealing properties thereof.

7 Claims, 4 Drawing Figures

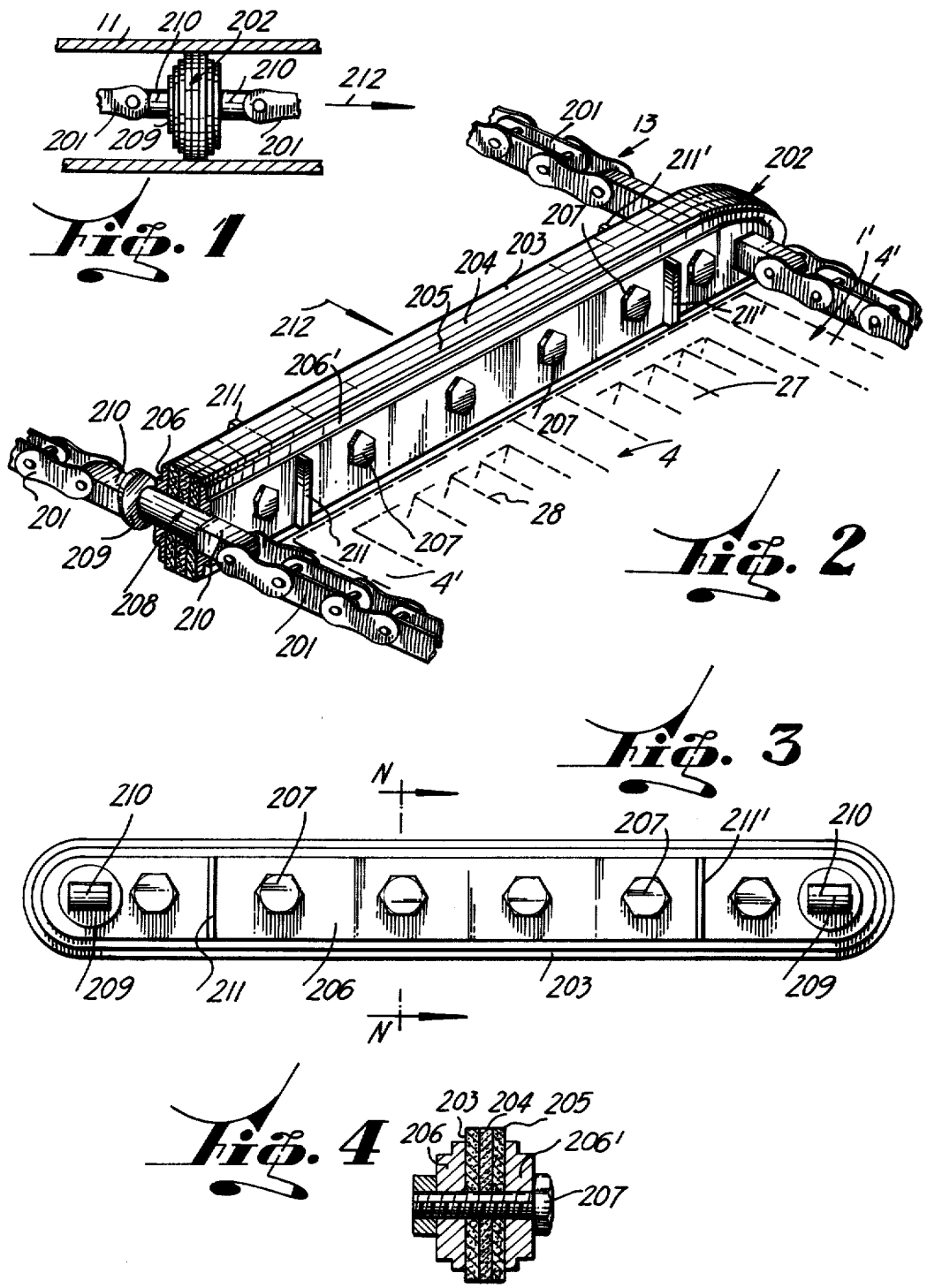

3,881,591

CONVEYING MEANS FOR A MOLD STRUCTURE

BACKGROUND OF THE INVENTION

1. Cross-Reference to Related Application

This application is a divisional of application Ser. No. 165,065 filed on July 22, 1971 now U.S. Pat. No. 3,778,018.

2. Field of the Invention

The present invention relates to conveying means for moving a mold structure along in the production of sweets or candies and more particularly this arrangement is preferably used where the core portion of the product is of foamed or alveolar structure.

The expressions "sweet" and "candy", for the purpose of this specification and the appendant claims are to be interpreted as meaning an edible product which is sweet and delicious to the palate. In a preferred use the arrangement is employed for producing chocolate tablets, the core portion of which is foamed chocolate.

In the manufacture of sweets of the type hereinabove cited and specially when they are manufactured by a continuous process, the molds have to pass through a series of treatment stations and to this end, conveying means of different types are provided. In some parts of such a continuous process the movement of these molds is performed by chains which are located below the mold to convey the mold. When the chains begin to contact the mold to move the mold due to the differences in potential and kinetic energy of the stationary molds with regard to the moving chains, friction is encountered and thereby resulting in a premature wear of the portions in frictional contact, particularly of the molds. Furthermore, it also happens in a number of processes that the molds have to be transferred from one endless conveyor to another, arranged at different levels. The movement from one level to the next lower one is performed through sloped guide means, whereby impacts are unavoidable, and said impacts tend to deform the mold structure.

The molds are to be conveyed through zones and/or stations by pushing members, so that during such movement the molds have to slide along stationary runways. In this event it becomes desirable to reduce the friction coefficient to a minimum to thus achieve the movement of the mold with a minimum of energy and in addition the molds should be of a particular design to avoid that the runways will be damaged and/or worn out, since these runways have to operate in combination with sealing means which at the same time have to be the pusher devices for the molds and if these runways would be worn out, the sealing means would become inoperative.

With regard to the conveying means which include sealing means, these are necessary in order to be able to convey the molds from a first ambient at a predetermined pressure, to a second ambient at a higher or lower pressure than the first ambient and from said second ambient after the mass in the mold having been treated therein, back to the first ambient.

The conveying means are provided with sealing means to maintain both ambients sealed apart and yet to provide an arrangement, whereby the molds may be continuously conveyed along a path from the first ambient through the second ambient and back to the first ambient. More particularly, this invention provides pressure sealed conveying means which will convey molds into and/or out of a space which is under pressure, above or below atmospheric pressure, without permitting blow back or escape of air or gases of the ambient which is above or below atmospheric pressure.

The invention is preferably, although not exclusively, applied to a process for manufacturing foamed chocolate, where the mold is charged in the first ambient, at atmospheric pressure, with a flowable, pasty, plastic, warm mass containing bubbles and then transferred to a vacuum zone where the bubbles contained in the mass of the mold are allowed to expand in order to produce a foamed material, such as foamed chocolate and in said second ambient said pasty warm mass is also allowed to cool, to harden and to be then discharged from said vacuum zone, which is a chamber, back to the ambient at atmospheric pressure to be subject to further treatments.

To this end the vacuum chamber is provided with a tubular inlet nozzle member i.e. a casing and a tubular outlet nozzle member i.e. a casing and the conveying means have to move each mold from the first ambient at atmospheric pressure through the inlet nozzle member to the second ambient which is the vacuum chamber and then after having passed through the vacuum chamber through the outlet nozzle member back to the first ambient. These molds should move substantially continuously and therefore the conveying means must be provided with suitable sealing means which enable such continuous movement and yet maintain the low pressure in the vacuum chamber. In addition, the conveying means must be so conceived that they are suitable for conveying the molds.

In order to achieve this purpose, the sealing means forming part of the conveying means must be of a peculiar structure and in addition they should be provided with adjustment means which enable the size of the sealing means to be increased by a simple operation, if these sealing means, after a prolonged use, become worn, to recreate the correct sealing properties.

3. Description of Prior Art

Pressure sealed conveying apparatus have already been suggested, where the conveyor consists of an endless flexible member carrying yieldable flights of rubber-like material which are disc-shaped and the endless flexible member passes through the middle portions of these flights, so that they are only suitable to transport granular loose material between pairs of flights and the entire arrangement must be stopped and disassembled each time one of the flights becomes inoperative.

It will be evident to those skilled in the art that these known arrangements are not suitable for conveying molds because the flights cannot exert at the same time a strong pushing force on the molds, since these rubber flights would thereby be bent and lose the sealing contact with the nozzle members. Furthermore, the time which is required to change one, several or all the flights each time they are worn out, is substantial because the entire equipment has to be stopped and this should be avoided.

Returning now to the features of the molds hereinabove referred to, it is not possible to make an analysis with regard to what is already known in this field because the requirements which must be fulfilled by the molds of the present invention were not needed in industry so far.

SUMMARY OF THE INVENTION

Accordingly, the present invention relates to conveying means preferably for conveying molds for producing sweets and the like, which molds have to be conveyed through tubular nozzle members, comprising a series of resilient wearable, pressure expandable, heat insulating partition members, one adjacent the other defining a sealing body and the periphery of which substantially corresponds to the internal periphery of said tubular nozzle members, a pair of backing plates each one backing up respectively the front and rear face of said sealing body, said backing plates being rigid and the area of which is less than that of the front and rear faces of said sealing body so that the edges of said backing plates are spaced apart from the edges of the pertinent partition members, and adjustable clamping means passing through said backing plates and sealing body and capable of exerting a compressive pressure on the assembly formed by said backing plates and partition members forming said sealing body, said endless conveyor consisting of two flexible spaced apart drawing members passing through said assembly in the marginal zones thereof, but spaced apart from the edges of said assembly and being anchored to said assembly.

BRIEF DESCRIPTION OF THE DRAWINGS

In order to facilitate the comprehension of the details of the present invention, reference will now be made, by way of example to a preferred embodiment in relationship to the accompanying drawings, in which:

FIG. 1 is a schematic elevation showing part of a tubular inlet nozzle member in section connected at one end portion to a high vacuum chamber (not shown) and where the sealing means are shown in side view.

FIG. 2 is a perspective view of part of the conveyor means including a pair of chains and the sealing means which latter is partially shown in section to better illustrate the linking means with the pertinent chain.

FIG. 3 shows the rear face of the sealing means in elevation.

FIG. 4 is a longitudinal section according to line N—N of FIG. 3.

DESCRIPTION OF THE PREFERRED EMBODIMENT

The conveyor means of the present invention for conveying the molds through zones at different pressures are generically identified by reference numeral 13 in FIG. 2. These endless conveyor means consist actually of a pair of spaced apart chains 201 and 201', supporting spaced apart sealing means 202 cross-wise arranged with regard to the longitudinal path defined by the pair of chains 201 and 201'. More particularly, each sealing means 202 consists of a series of flexible, wearable, pressure expandable, heat insulating partition members such as the thick leather partition members 203, 204, 205, the periphery of which has a shape which corresponds to the shape of a cross section of the nozzle member 11. These partition members are arranged in side by side relationship and define a sealing body.

A rigid thin backing plate 206, 206' is attached to each of the outer partitions 203 and 205. The area of each backing plate 206, 206' is smaller than the pertinent partition members so that said backing plates will not enter in frictional egagement with the nozzle member 11. Backing plates 206 and 206' are preferably made of metal i.e. they are heat conductive.

A series of screw and nut arrangements 207 defining adjustable pressure exerting or clamping means are located in the just described assembly between the pair of chains 201 and 201' or the like flexible drawing means. Coupling pins 208 are mounted in the outer portions of the sealing means 202 and the chains 201, 201' are pivotally linked thereto. The rear end portion of each coupling pin 208 is provided with an abutting disc 209 of larger diameter than the pertinent perforations through which the pins 208 pass and are in abutting contact with the rear plate 206. The chains 201 and 201' are pivoted to projecting tongue portions 210 of pins 208. Plates 206 and 206' are each provided, near the chains, with pushing ribs 211, 211'.

In view of the foregoing, it will be understood that only the periphery of the leather partitions 203, 204, 205 are in sealing contact with the nozzle member 11. Upon the chains moving in the direction indicated by arrow 212, the abutting discs 209 exert a pushing force on the sealing means 202. The distance existing between each pair of sealing means 202 is slightly larger than the length of each mold and which has been identified in FIG. 2 by reference numeral 1'. In this embodiment mold 1' has semi-cylindrical recessed portions 27 spaced apart by ridge-like projections 28 defining molding cavities surrounded by band like zones 4' defining inlets 4 for the recesses 27. Thus, the sealing means 202 enters in pushing contact with the pertinent mold through the pushing ribs 211, 211'.

The mold becomes thus housed between a pair of chains 201 201' and slides along the bottom portion or runway of the pertinent nozzle member in a substantially sealed inclosure. If the leather partition members 203, 204, 205 become worn out and therefore do not perfectly carry out the sealing, it is sufficient to further fasten the screw and nut arrangements 207, whereby due to the resiliency of the leather partition members, these increase their cross sectional areas and thereby a perfect sealing is again achieved. It will be readily understood that in view of the arrangement hereinabove described, the chains 201 and 201' are so supported that they will not enter in frictional engagement with the nozzle member 11, and while the sealing means 202 support the chains 201, 201' the sealing means 202 is drawn along by the chains.

Although one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. Endless conveyor means provided with two spaced apart, flexible drawing members passing through spaced apart carrier partitions, each of said carrier partitions consisting of at least one resilient, wearable, pressure expandable, heat insulating partition member having a front face, a rear face and a periphery, clamping members, hard front and rear backing plates positioned, with the aid of said clamping members passing through said backing plates and said resilient partition member, onto said front and rear faces, said backing plates having peripheries which remain within the periphery of said resilient member, said clamping members being length-wise adjustable to reduce the mutual distance between said backing plates, each heat insulating partition member and its hard front backing plate being shiftable along a portion of said drawing members, an abutment on each said portions adapted to enter in abutting and blocking contact with said rear backing plate, and said drawing members passing through said backing plates adjacent the peripheries thereof.

2. Conveying means preferably for conveying molds for producing sweets and the like, which molds have to be conveyed through tubular nozzle members, comprising a series of resilient wearable, pressure expandable, heat insulating partition members, one adjacent the other defining a sealing body and the periphery of which substantially corresponds to the internal periphery of said tubular nozzle members, a pair of backing plates having peripheral edges, each backing plate backing up respectively the front and rear face of said sealing body, said backing plates being rigid and the area of which is less than that of the front and rear faces of said sealing body so that the edges of said backing plates are spaced apart from the edges of the pertinent partition members, and adjustable clamping means passing through said backing plates and sealing body and capable of exerting a compressive pressure on said backing plates and partition members forming said sealing body, said endless conveyor consisting of two flexible spaced apart drawing members passing through said backing plates and partition members in the marginal zones thereof, but spaced apart from said peripheral edges of said backing plates, and being in pushing relationship with the backing plate which is in abutting relationship with said rear face, at least said backing plate which backs up said front face and said partition members are slidable on said drawing members towards said backing plate which backs up said rear face, thereby allowing adjustment of said sealing body through said clamping means without changing the length of said endless conveyor.

3. The conveying means as claimed in claim 2, wherein said backing plates are heat conductive.

4. The conveying means as claimed in claim 3, wherein said backing plates are metallic plates and include projecting pushing ribs.

5. The conveying means as claimed in claim 2, wherein said partition members are made of leather.

6. The conveying means as claimed in claim 2, wherein said drawing members are chains.

7. The conveying means as claimed in claim 6, wherein a pair of coupling pins passes through said backing plates and partition members, each coupling pin being provided with a disc in pushing relationship with the backing plate which is in abutting relationship with said rear face and free ends of each of said coupling pins having tongue portions projecting out of said backing plates and said chains being pivoted to said tongue portions.

* * * * *